United States Patent [19]
Stevenson

[11] Patent Number: 4,862,638
[45] Date of Patent: Sep. 5, 1989

[54] TARP BUG CATCHER

[76] Inventor: Curtis A. Stevenson, 3722 E. Pasadena, Phoenix, Ariz. 85018

[21] Appl. No.: 268,494

[22] Filed: Nov. 8, 1988

[51] Int. Cl.$^4$ .......................... A01M 1/14; A01M 1/20
[52] U.S. Cl. ........................................ 43/114; 43/131; 52/3
[58] Field of Search ................... 43/114, 131; 52/3, 5

[56] References Cited
U.S. PATENT DOCUMENTS

| 431,537 | 7/1890 | Trenner | 43/114 |
| 510,727 | 12/1893 | Thum | 43/114 |
| 671,961 | 4/1901 | Heinritz | 43/114 |
| 693,536 | 2/1902 | Baker | 43/114 |
| 1,351,285 | 8/1920 | Chess | 43/131 |
| 2,911,756 | 11/1959 | Geary | 43/114 |
| 3,913,259 | 10/1975 | Nishimura et al. | 43/114 |

FOREIGN PATENT DOCUMENTS

| 58702 | 1/1975 | Australia | 52/3 |
| 8702863 | 5/1987 | PCT Int'l Appl. | 43/114 |
| 639242 | 11/1983 | Switzerland | 43/131 |

Primary Examiner—Richard K. Seidel
Assistant Examiner—Carmine Cuda

[57] ABSTRACT

This invention relates to a tarp for use as ground cover one example of which employs a barrier such as an adhesive strip on its top surface inwardly of and juxtapositioned of its periphery which has a tear-away strip over it which upon removal when the tarp is stretched over the ground traps bugs, insects and the like which attempt to crawl over it.

4 Claims, 1 Drawing Sheet

U.S. Patent  Sep. 5, 1989  4,862,638
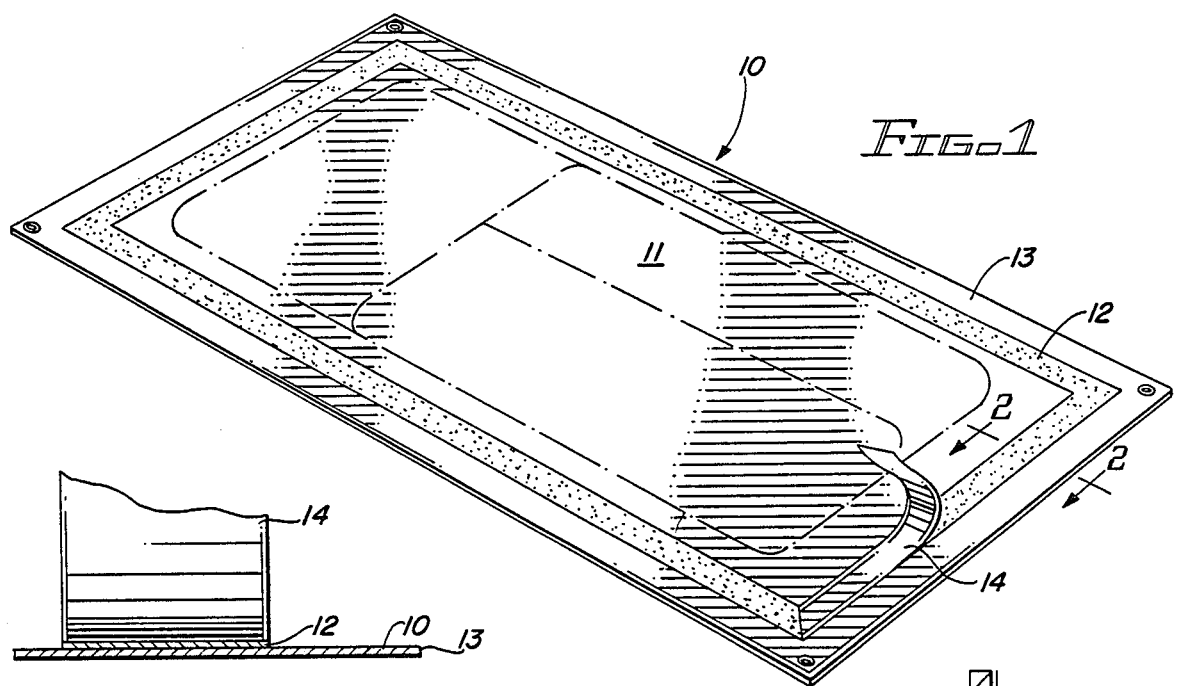
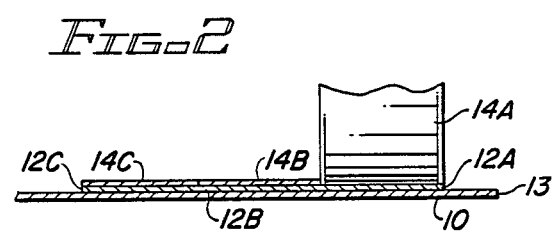
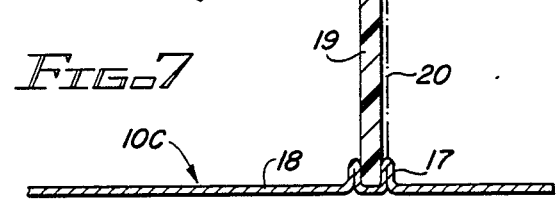
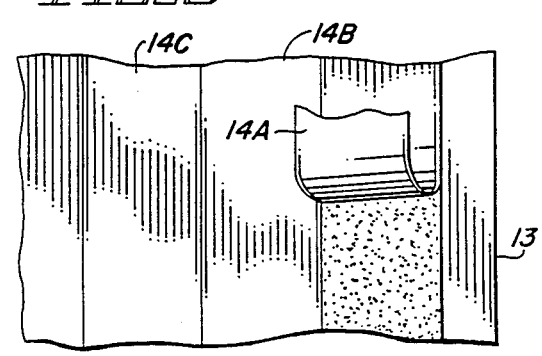
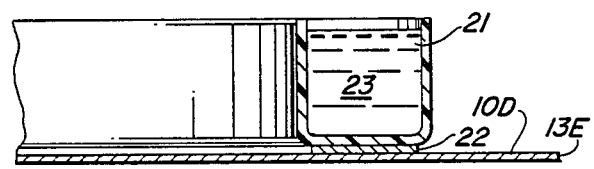
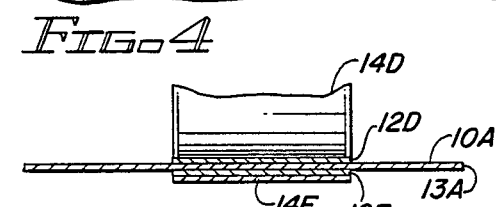
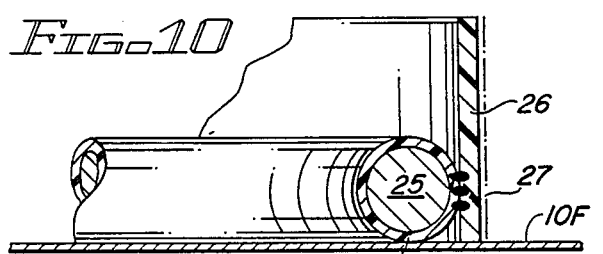
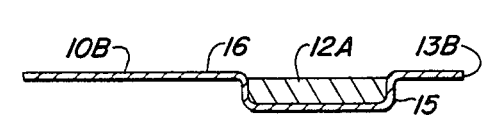
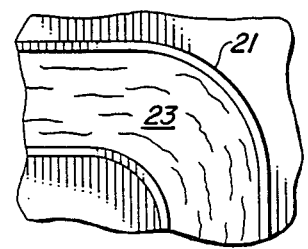
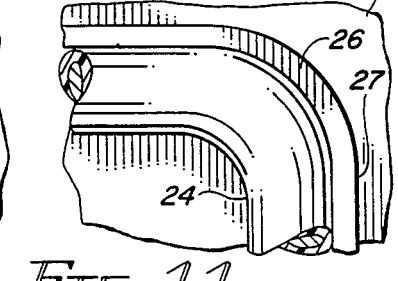

TARP BUG CATCHER

BACKGROUND OF THE INVENTION

This invention relates to bug catchers and more particularly to tarps which employ an adhesive strip of material around its periphery for catching and firmly holding bugs, ants and the like which attempt to crawl onto and over the tarp.

DESCRIPTION OF THE PRIOR ART

Adhesive strips for catching and holding flying bugs such as flies, moths, bees and the like are known. Such strips, however, do not prevent the problem of crawling insects, particularly those encountered when camping whether sleeping on the ground or on a cot in a tent.

SUMMARY OF THE INVENTION

In accordance with the invention claimed, a new and improved article of manufacture is provided which catches and holds crawling insects.

It is, therefore, an object of this invention to provide a new and improved tarp employing an adhesive strip of material around its periphery.

Another object of this invention is to provide a new and improved tarp having an adhesive strip mounted around and just inside the periphery of the tarp on its top surface which is covered by a tear-away strip until used.

A further object of this invention is to provide a new and improved tarp which is provided with a groove in its top surface around its periphery which is filled with an adhesive or water when the tarp is unrolled for aiding in catching crawling insects and the like.

A still further object of this invention is to provide a tarp the top surface of which is grooved around its periphery for receiving therein when unrolled for use water and/or sand in free form or in an elongated cylindrical container for weighting the edge of the tarp and providing a barrier for insects to crawl over.

Further objects and advantages of this invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which:

FIG. 1 is a perspective view of an extended tarp and embodying the invention;

FIG. 2 is a cross-sectional view of FIG. 1 taken along the line 2—2;

FIG. 3 is a cross-sectional view similar to the view illustrated in FIG. 2 embodying a common adhesive strip which is covered by three different layers of tear-away paper stripping;

FIG. 4 is a top view of FIG. 3;

FIG. 5 is a partial perspective view of a tarp having adhesive strips at least partially around a tarp on a common portion of both surfaces of the tarp and covered with a tear-away paper strip;

FIG. 6 is a modification of the adhesive strip of FIG. 1 wherein the tarp is provided with a groove around its periphery filled with an adhesive;

FIG. 7 is a further modification of the tarp shown in FIG. 1 wherein the tarp is grooved around its periphery to receive a barrier extending into the groove and laterally of its top surface;

FIG. 8 is a still further modification of the tarp configuration shown in FIGS. 1–7 wherein a tarp or pad is provided with an adhesively attached trough around its periphery which is filled with water;

FIG. 9 is a top view of FIG. 8;

FIG. 10 is a still further modification of the tarp configuration shown in FIGS. 1–9 wherein a tubular water filled tube is mounted on the tarp around its periphery with a barrier extending laterally from the tarp around the outside periphery of the tube, the barrier of which contains an adhesive coating on at least one of its surfaces; and FIG. 11 is a top view of FIG. 10.

DESCRIPTION OF THE PREFERRED EMBODIMENT

Referring more particularly to the drawing by characters of reference, FIG. 1 and 2 disclose a tarp or pad 10 that is used in its unrolled condition as a ground covering for supporting a sleeping bag 11 (shown in dash lines) or the like while camping in the outdoors. Although shown as a 4 by 8 foot rectangular pad configuration, it could be larger or smaller and of different shapes so that it could be positioned underneath a tent, picnic table or the like.

Pad 10 which may comprise a multi-layered flexible water and moisture repellent cloth is provided on its top with an adhesive layer of material 12 spacedly positioned inwardly of and juxtapositioned to edge 13 of the pad. This material is covered by a suitable tear-away strip 14.

The width of the strip of material 12 may be of any suitable size, but should be wide enough to prohibit bugs and other like creatures from crawling over it.

FIGS. 3 and 4 disclose a modification of the invention illustrated in FIGS. 1 and 2, wherein the pad 10 is provided with either one wide adhesive strip of material 12 or three separate side-by-side strips of adhesive materials 12A, 12B and 12C spaced inwardly of the edge 13 of the pad which are covered by three separate tear-away strips 14A, 14B and 14C, as shown. Thus, the adhesive material 12A, 12B and 12C may be sequentially torn away at different times or simultaneously as so desired.

FIG. 5 illustrates a further modification of the invention illustrated in FIGS. 1–4 wherein a pad 10A is provided with an adhesive layer of material 12D and 12E adjacent the edge 13A of the pad, one on the top surface, and one on the bottom surface of the pad and each covered by an adhesive tear-away strip 14D and 14E, as shown.

FIG. 6 illustrates a still further modification of the pads illustrated in FIGS. 1–5 wherein pad 10B is formed to provide a groove 15 in its top surface 16 within and adjacent its peripheral edge 13B that is filled with an adhesive material 12A.

FIG. 7 illustrates another modification of the pads illustrated in FIGS. 1–6 wherein pad 10C is provided with a crimp 17 in its top surface 18 adjacent the edge of the pad which crimp provides a groove for receiving a barrier 19 arranged to extend laterally of the top surface of pad 10C. As shown, this barrier may be provided with an adhesive material 20 on its outer surface for catching and holding crawling insects, snakes and the like.

FIGS. 8 and 9 disclose an open trough 21 adhesively attached when pad 10D is unrolled to an adhesive strip of material 22 formed around and inwardly of the peripheral edge 13E of the pad. This trough may be filled with water 23 or the like, which forms a barrier for crawling insects that want to crawl over the pad.

FIGS. 10 and 11 illustrate a still further modification of the invention illustrated in FIGS. 1-9 wherein a tarp or pad 10F is provided with a tubular barrier 24 which is positioned on the top surface of the pad inwardly of its periphery which is filled with sand or water 25. Adhesively attached to the outer periphery of the tubular barrier 24 is a barrier 26 of the type shown in FIG. 7 which may have an outer surface of adhesive material 27.

It should be noted that the adhesive material may contain an ingredient or substance which is a poison to insects and still fall within the scope of this invention.

Further, the tarp and its adhesive strip around one edge of its periphery may be provided around a tent door opening or comprise a part of a survival kit.

A practical ground tarp or pad with insect trap is thus provided for use when camping in accordance with the stated objects of the invention, and although but a few embodiments of the invention have been illustrated and described, it will be apparent to those skilled in the art, that various changes and modifications may be made therein without departing from the spirit of the invention or from the scope of the appended claims.

What is claimed is:

1. A ground pad comprising:
   a thin ductile member capable of folding and rolling into a compact form and being extended into a relatively flat planar form having top and bottom surfaces,
   an adhesive strip of material positioned on the top surface of said member juxtapositioned to and inwardly of its periphery,
   said material circumscribing and defining a major central area of said top surface which is free of adhesive,
   said material being provided with a substance poisonous to insects and crawling bugs, and
   means comprising at least one tear-away strip of pliable material covering said material,
   said tear-away strip being removed when said pad is extended for ground cover use for exposing said material so that it will entrap insects crawling thereover whereby a user may be supported by said central area and protected from said crawling insects.

2. The ground pad set forth in claim 1 wherein:
   said means comprises at least another strip of adhesive material juxtapositioned to said strip of adhesive material, and
   at least another tear-away strip of pliable material covering said another strip of adhesive material.

3. The ground pad set forth in claim 1 wherein:
   said member is provided with a pair of adhesive strips one positioned on the top surface of said member and the other on the bottom surface of said member, and
   said means comprises a pair of tear-away strips of pliable material one covering each of said strips.

4. The ground pad set forth in claim 3 wherein:
   said pair of adhesive strips are each positioned an equal distance inwardly of the periphery of said member.

* * * * *